US012704734B2

(12) United States Patent
Cohoon et al.

(10) Patent No.: US 12,704,734 B2
(45) Date of Patent: Aug. 11, 2026

(54) INCREASING UNIFORMITY OF ILLUMINATION OF A REGION OF A LOCAL AREA BY AN ILLUMINATOR INCLUDING AN ARRAY OF LIGHT SOURCES

(71) Applicant: Meta Platforms Technologies, LLC, Menlo Park, CA (US)

(72) Inventors: Gregory Cohoon, Sunnyvale, CA (US); Scott Lerner, Redmond, WA (US); Harish Venkataraman, Buckley, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 317 days.

(21) Appl. No.: 18/520,937

(22) Filed: Nov. 28, 2023

(65) Prior Publication Data

US 2025/0172816 A1 May 29, 2025

(51) Int. Cl.
*G02B 27/01* (2006.01)
*G02B 27/09* (2006.01)

(52) U.S. Cl.
CPC ..... *G02B 27/0961* (2013.01); *G02B 27/0172* (2013.01); *G02B 27/0972* (2013.01);
(Continued)

(58) Field of Classification Search
CPC ............ G02B 27/0961; G02B 27/0172; G02B 27/0972; G02B 27/0905; G02B 27/0922; G02B 27/0101; G02B 2027/0118; G02B 2027/0178; G02B 2027/0138; G02B 2027/014; G02B 19/0014; G02B 19/0066;
(Continued)

(56) References Cited

U.S. PATENT DOCUMENTS 5,900,981 A * 5/1999 Oren .................... G02B 3/0056 359/619
7,810,931 B2 10/2010 Kawamura et al.
(Continued)

OTHER PUBLICATIONS

European Search Report for European Patent Application No. 24191872.1, dated Jan. 20, 2025, 8 pages.

*Primary Examiner* — William R Alexander
(74) *Attorney, Agent, or Firm* — FREESTONE INTELLECTUAL PROPERTY LAW PLLC; Aaron J. Visbeek

(57) ABSTRACT

A depth camera assembly includes an illuminator that dynamically illuminates different regions of a local area. The illuminator comprises an array of light sources, such as a vertical-cavity surface emitting laser (VCSEL) array, and a lens assembly. The array of light sources may include a plurality of groups of one or more light sources, with each group being independently addressable. The lens assembly is positioned so a focus of the lens assembly is in a plane where illumination from adjacent light sources of the array at least partially overlaps. Such positioning of the lens assembly focus causes light from adjacent light sources to blur into each other, forming flood illumination for a region of the local area. In some embodiments, the flood illumination may alternatively or additionally be achieved by introducing aberration into the lens assembly, including a microlens array in the illuminator or some combination thereof.

20 Claims, 9 Drawing Sheets

(52) U.S. Cl.
CPC ................. *G02B 2027/0118* (2013.01); *G02B 2027/0178* (2013.01)

(58) Field of Classification Search
CPC ....... G02B 19/0057; F21V 5/04; F21V 14/06; F21V 33/0052; G01S 7/4802; G01S 7/4808; G01S 17/88; G01S 17/894
USPC .......................................................... 359/619
See application file for complete search history.

(56) References Cited

U.S. PATENT DOCUMENTS 9,918,073 B2 3/2018 Ko et al.
9,992,474 B2 6/2018 Grunnet-Jepsen et al.
10,019,897 B2 7/2018 Pekarski et al.
10,598,771 B2 3/2020 Wang et al.
10,924,638 B2 2/2021 Swaminathan et al.
11,022,724 B2 * 6/2021 Carson .................. G02B 3/005
11,063,407 B1 7/2021 Ginzburg
11,092,719 B1 8/2021 Zhu
11,255,514 B2 * 2/2022 Osaka ................. G03F 7/70075
11,512,836 B2 11/2022 Rossi et al.
11,774,060 B2 * 10/2023 Eilertsen ................. F21V 5/007 362/235
11,927,339 B2 * 3/2024 Yousefi ............... F21V 33/0052
2005/0264893 A1 * 12/2005 Brown .................. H01S 5/4031 359/618
2006/0232859 A1 * 10/2006 Ebina ................... G03B 21/625 359/619
2013/0343051 A1 12/2013 Holman et al.
2016/0085078 A1 3/2016 Ronen et al.
2018/0267214 A1 * 9/2018 Rossi ..................... G02B 27/48
2019/0049097 A1 * 2/2019 Rossi .................... F21V 23/003
2020/0248890 A1 * 8/2020 Osaka ...................... G02B 7/04
2020/0310005 A1 * 10/2020 Carson ................. G02B 3/0062
2023/0220974 A1 * 7/2023 Eilertsen ............ G01B 11/2536 362/235

* cited by examiner

INCREASING UNIFORMITY OF ILLUMINATION OF A REGION OF A LOCAL AREA BY AN ILLUMINATOR INCLUDING AN ARRAY OF LIGHT SOURCES

FIELD OF THE INVENTION

This disclosure relates generally to artificial reality systems, and more specifically to illuminating regions of interest for depth sensing in artificial reality systems.

BACKGROUND

Various augmented reality applications make use of interactions between a user of an augmented reality headset and physical objects in the local area surrounding the augmented reality headset or make use of interactions between virtual content placed in the user's environment and physical objects and surfaces in the local area. For example, if part of a virtual object is behind a real object, the occlusion is detected by the augmented reality headset to prevent rendering of the so the occluded part of the virtual object on the user's display. To detect objects in a local area and distances between the AR headset and the objects, the augmented reality headset determines depth information for one or more objects in a local area.

Various augmented reality headsets obtain depth information for objects in a local area using direct time-of-flight (dTOF), which measures round-trip travel time of photons generated by multiple pulses of light from an illuminator emitted into the local area and detection of reflections of the pulses of light by a detector. In conventional direct time-of-flight implementations, an illuminator emits multiple beams of collimated light into a local area, with each beam corresponding to a light source within the illuminator. Emission of different collimated beams causes beams of light to illuminate portions of the local area, while portions of the local area outside of a collimated beam of light are not illuminated. This causes different regions within the local area to be non-uniformly illuminated by the illumination sensor, which may decrease a signal to noise ratio of data captured by the detector. Additionally, detectors used in conventional dTOF sensors are often unable to capture a complete frame of depth information for an area that is illuminated by the illuminator, so conventional dTOF systems often scan a region in a local area by illuminating different portions of the area at different times. While this mitigates non-uniform illumination of the region by the illuminator, such scanning increases power consumption of the illuminator.

SUMMARY

An illuminator used by an artificial reality headset may include a plurality of light sources and a lens assembly. The light sources are positioned so each light source emits light in an emission plane. In various embodiments, the lens assembly is positioned relative to the emission plane such that a focus of the lens assembly is offset from the emission plane. In some embodiments, a focus of the lens assembly is in an overlap plane that is offset from the emission plane. The overlap plane is a location where light emitted by adjacent light sources at least partially overlaps or overlaps by at least a threshold amount. For example, the overlap plane is nearer to a local area into which the illuminator emits than the emission plane along an axis perpendicular to the emission plane. As the lens assembly directs light from the light sources into the local area, positioning the focus of the lens assembly at the overlap plane causes the illuminator to emit a pattern of light in the overlap plane into the local area. As the pattern of light in the overlap plane has light from adjacent light sources at least partially overlapping, the lens assembly emits more uniform light from the light sources into the local area, providing more uniform illumination of a region of interest in the local area where the illuminator is directed.

In various embodiments, an illuminator comprises an array of light sources, with each light source configured to emit light. The illuminator also includes a lens assembly configured to receive light emitted by one or more of the light sources and to direct the light into a local area. The lens assembly is positioned relative to the array of light sources so a focus of the lens assembly is in an overlap plane where light from adjacent light sources of the array at least partially overlaps. The overlap plane is separated from an emission plane that includes a surface of the light sources from which light is emitted.

In various embodiments, an illuminator comprises an array of light sources, with each light source configured to emit light. The illuminator also includes a lens assembly configured to receive light emitted by one or more of the light sources and to direct the light into a local area. The lens assembly has a focus within an emission plane that includes surfaces of the light sources from which light is emitted. Additionally, the lens assembly is configured to introduce one or more aberrations into light from a light source that disperses light from the light source prior to direction into the local area.

In some embodiments, a depth camera assembly includes an illuminator comprising an array of light sources, with each light source configured to emit light. The illuminator also includes a lens assembly configured to receive light emitted by one or more of the light sources and to direct the light into a local area. The lens assembly is positioned relative to the array of light sources so a focus of the lens assembly is in an overlap plane where light from adjacent light sources of the array at least partially overlaps. The overlap plane is separated from an emission plane that includes a surface of the light sources from which light is emitted. Additionally, the depth camera assembly includes one or more imaging devices configured to capture one or more images of a region of the local area into which light from the illuminator is directed.

Figure 1A:
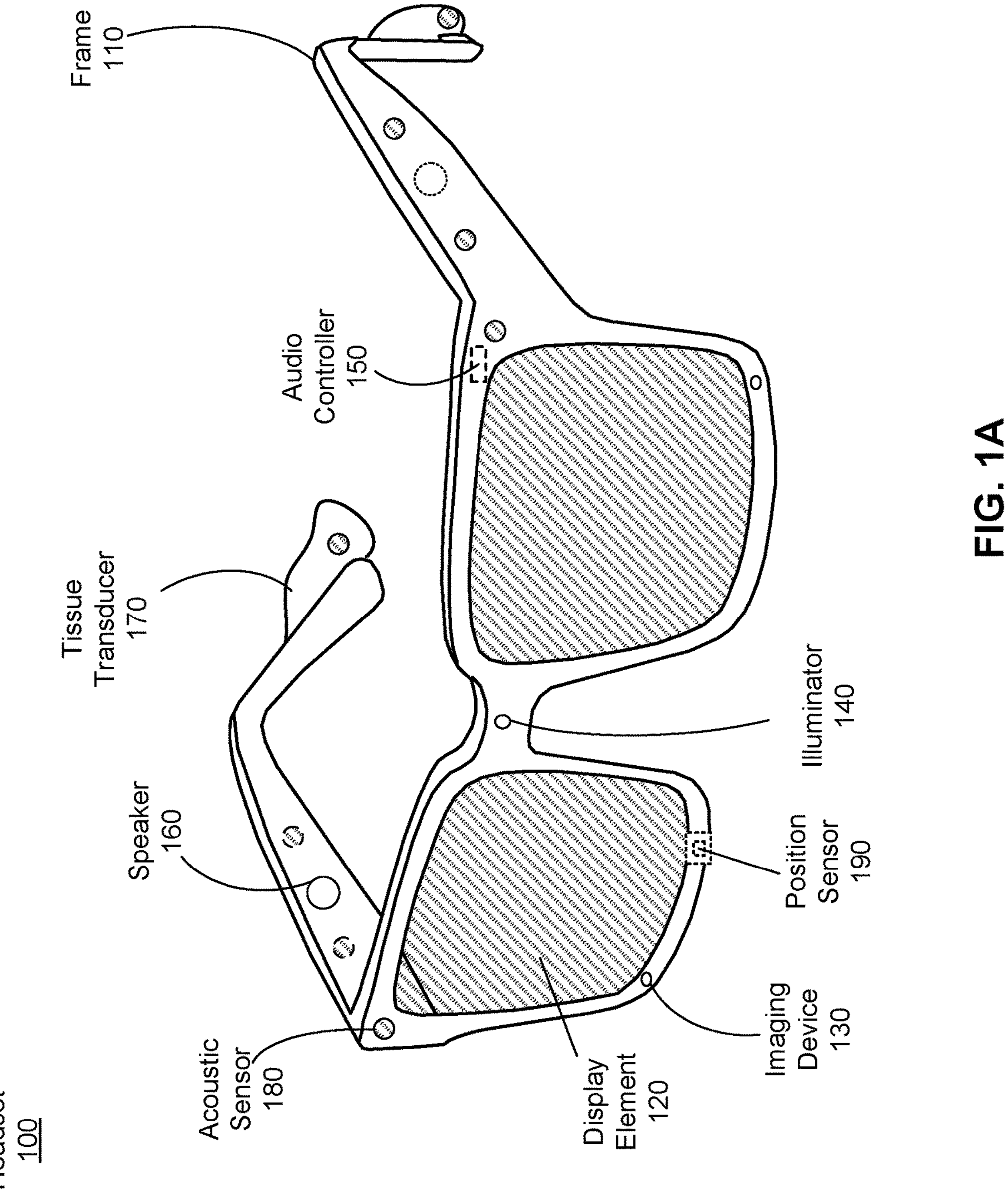
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Various augmented reality (AR) headsets obtain depth information for objects in a local area using direct time-of-flight (dTOF), which measures round-trip travel time of photons generated by multiple pulses of light from an illuminator and detection of photons reflected from the local area surrounding the illuminator by a detector. In conventional direct time-of-flight implementations, multiple beams of collimated light are each emitted by a separate light source within an illuminator are projected or directed into a local area surrounding the illuminator. Because discrete beams of light are directed into the local area, different regions within the local area are differently illuminated. Regions where a beam of light from a light source is directed have higher illumination than other regions that are between the discrete beams of light. This non-uniform illumination may decrease a signal to noise ratio of data captured by the detector. Additionally, the illuminator is often repositioned and activated to illuminate different portions of a region of the local area at different times to capture a complete frame of depth information for a portion of the local area. While this illumination of different portions of the region of the local area at different times mitigates non-uniform illumination of the region by the illuminator, such scanning increases power consumption power consumption of the illuminator.

To increase power efficiency of an illuminator (such as an illuminator of a depth camera assembly) and improve accuracy of data from illumination by the illuminator, the illuminator includes a plurality of light sources and a lens assembly. The light sources are positioned so each light source emits light in an emission plane. For example, the light sources are a set of VSCELs separated by a distance, with each VSCEL having an aperture emitting light in a common plane that is an emission plane. In various embodiments, the emission plane corresponds to a minimum spatial area of light emitted by each light source and a maximum divergence. In various embodiments, the lens assembly is positioned relative to the emission plane so a focus of the lens assembly is offset from the emission plane. In some embodiments, the offset is such that the focus is in an overlap plane that is offset from the emission plane. The overlap plane is a location where light emitted by adjacent light sources at least partially overlaps. For example, the overlap plane is nearer to a local area into which the illuminator emits than the emission plane along an axis perpendicular to the emission plane. As the lens assembly emits an illumination pattern from the focus of the lens assembly into the local area, having the focus of the lens assembly at the overlap plane causes emission of a pattern of light in the overlap plane, where light from a plurality of light sources at least partially overlaps, into the local area. Transmission of the light from the overlap plane allows the illuminator to emit light that uniformly illuminates a region of interest in the local area where the illuminator is directed.

In other embodiments, the illuminator includes a lens assembly configured to introduce one or more aberrations into light emitted by one or more light sources prior to projection or direction of the light into the local area. For example, the focus of the lens assembly is an emission plane of the array of light sources, and the lens assembly introduces one or more aberrations, such as spherical aberrations into the light from a light source to disperse light from the light source over a wider area prior to projecting the light into the local area. In some embodiments, this allows light from adjacent light sources to overlap with each other when directed into the local area without changing a focus of the lens assembly from the emission plane of the array of light sources. In other embodiments, one or more lens aberrations in combination with a change in focus may be used to cause light from the adjacent light sources to overlap with each other when directed into the local area.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

In various embodiments, the illuminator 140 includes an array of light sources, with each light source separated from adjacent light sources in the array by a distance. Each light source emits light. The illuminator 140 also includes a lens assembly, such as a projection lens, onto which light from the light sources is incident. The lens assembly directs or projects light from the light sources into the local area, illuminating a region within the local area with light from the light sources. To increase uniformity with which the region is illuminated by the illuminator, in various embodiments the lens assembly is configured to introduce overlap between light emitted by adjacent light sources when directing light from the light sources into the local area. For example, the lens assembly has a focus within an overlap plan where light from adjacent light sources at least partially overlaps, or overlaps at least a threshold amount, as further described below in conjunction with FIGS. 2-4. In other examples, the lens assembly is configured to introduce one or more aberrations into light from one or more light sources to create overlap between light from adjacent light sources before the light is directed into the local area, as further described below in conjunction with FIGS. 5-7.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 8.

Figure 1B:
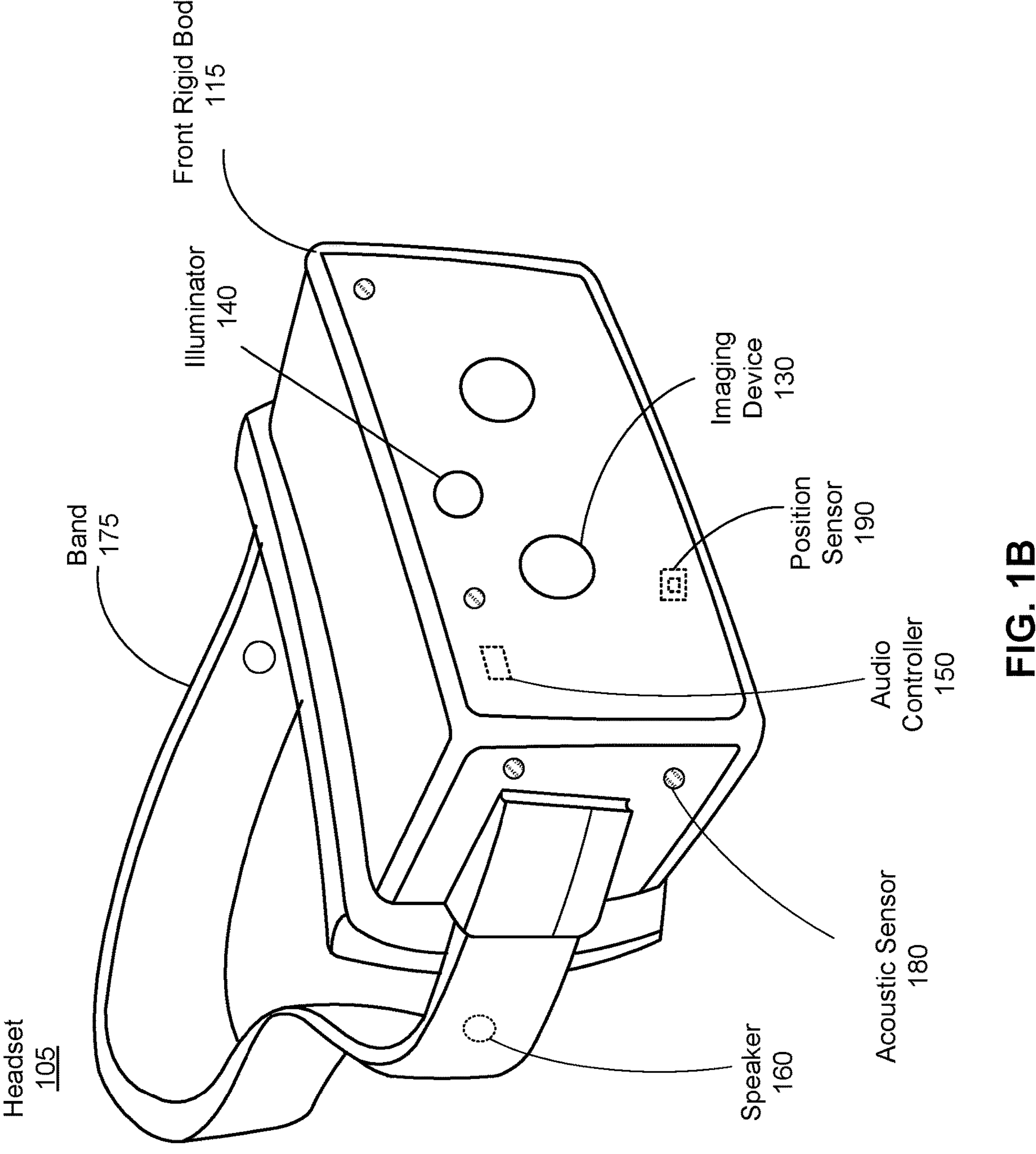
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
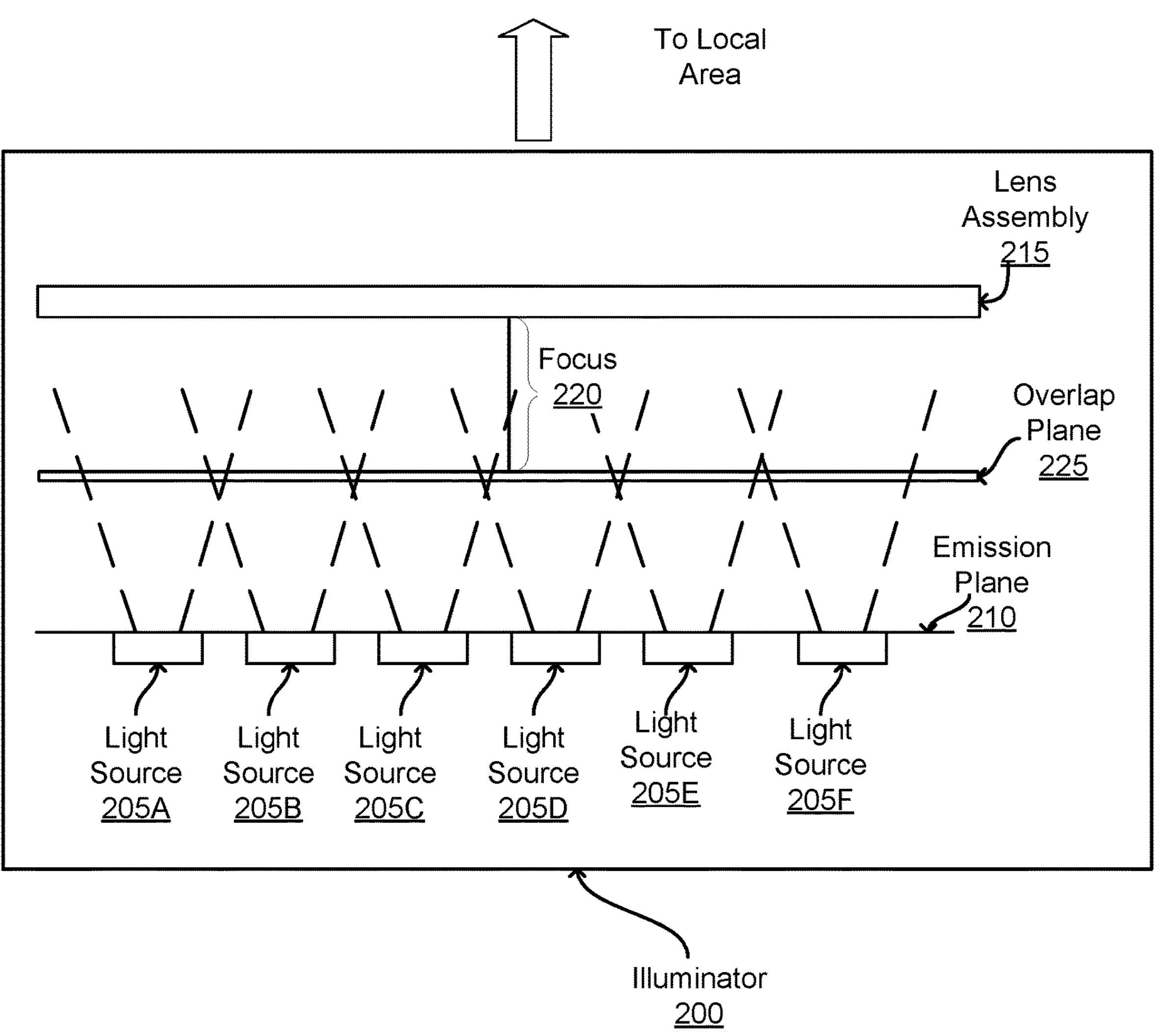
FIG. 2 is a block diagram of an illuminator included in a headset, in accordance with one or more embodiments.

FIG. 2 is a block diagram of one embodiment of an illuminator 200. The illuminator 200 may be an embodiment of the illuminator 140 further described above in conjunction with FIG. 1A. The illuminator 200 shown in FIG. 2 includes an array of light sources 205A-F (also referred to individually and collectively using reference number 205) and a lens assembly 215. In other embodiments, the illuminator 200 includes different or additional components than those described in conjunction with FIG. 2. In various embodiments, the illuminator 140 is included in a depth camera assembly (DCA) or is coupled to a DCA, such as further described above in conjunction with FIG. 1A.

Light sources 205 of the array of light sources 205 each emit light towards a local area in response to receiving a control signal. Each light source 205 has an optical aperture through which light exits the light source 205. In various embodiments, the light sources 205 are organized into multiple groups, with each group including one or more light sources 205. Each group may be individually addressable. For example, different groups may receive different control signals in various embodiments, so a selected group of light sources 205 to emits light, while other groups of light sources 205 that are not selected do not emit light. In some embodiments, different groups of light sources 205 include different numbers of light sources 205, while in other embodiments, each group includes a common number of light sources 205. Configuring the light sources 205 into different groups allows the illuminator 200 to independently activate different light sources 205 to emit light, adjusting illumination of a region in the local area where the illuminator 200 is directed.

The light sources 205 are positioned so the optical aperture of each light source 205 through which light is emitted is in a common plane, the emission plane 210. For example, each light source 205 is a vertical surface emitting cavity laser (VSCEL), with the VSCELs positioned relative to each other so an optical aperture of each VSCEL is positioned in the emission plane 210. While FIG. 2 shows the emission plane 210 as a row, the emission plane 210 may be a two-dimensional grid or array in various embodiments. In other embodiments, each light source 205 may be a different device that emits light in a direction from the emission plane 210. Further, the light sources 205 are positioned so there is a distance between adjacent light sources 205. A common distance is between each pair of adjacent light sources 205 in various embodiments.

In various embodiments, the emission plane 210 corresponds to an emission waist of light emitted by each light source 205, with the emission waist corresponding to a location of minimum divergence of light emitted by the light source 205 (e.g., at the emission plane 210). In the emission plane 210, light emitted from adjacent light sources 205 does not overlap.

The lens assembly 215 directs light received from one or more light sources 205 into a local area surrounding the illuminator 200. In various embodiments, the lens assembly 215 includes a projection lens. In other embodiments, the lens assembly 215 includes a collimating lens. As illustrated, the lens assembly 215 is positioned relative to the array of light sources 205 so a focus 220 of the lens assembly 215 is positioned in an overlap plane 225 of the array of light sources 205. In other embodiments, the focus may be at some other offset from the emission plane 210. The overlap plane 225 is a location separated from the emission plane 210 by a distance and is a location where light emitted by adjacent light sources 205 of the array at least partially overlaps with each other. The distance separating the overlap plane 225 from the emission plane 210 is along an axis perpendicular to the emission plane 210. For example, the overlap plane 225 is a distance from the emission plane 210 and is in a location where light emitted by light source 205B partially overlaps with light emitted by light source 205A and light emitted by light source 205C. In various embodiments, the overlap plane 225 corresponds to a distance from the emission plane 210 where light emitted by adjacent light sources 205 has at least a threshold amount of overlap, which may differ in different embodiments.

The distance between the emission plane 210 and the overlap plane 225 along the axis perpendicular to the emission plane 210 is based on characteristics of the lens assembly 215, such as a distance between adjacent light sources 205, dimensions of the light sources 205, a beam waist of light emitted by the light sources 205 (e.g., a diameter of light emitted by a light source 205 at the emission plane 210), an amount of divergence of light emitted by a light source 205, or other characteristics. For example, an array with a smaller distance between adjacent light sources 205 results in the overlap plane 225 being nearer to the emission plane 210 along the axis perpendicular to the emission plane 210, while an array with a greater distance between adjacent light sources 205 results in the overlap plane 225 being farther from the emission plane 210 along the axis perpendicular to the emission plane 210. As another example, an array including light sources 205 with smaller amounts of divergence of light emitted by the light sources 205 causes the overlap plane 225 to have a greater distance from the emission plane 210 along the axis perpendicular to the emission plane 210 than for an array including light sources 205 with greater amounts of divergence (i.e., light that diverges more quickly as it is emitted from a light source 205).

As the lens assembly 215 projects (or directs) lights from the focus 220 of the lens assembly into the local area, an illumination pattern from the light sources 205 at the overlap plane 225 is projected into the local area by the lens assembly 215. In the configuration of FIG. 2, as light from adjacent light sources 205 overlaps in the overlap plane 225, the lens assembly 215 projects overlapping light from adjacent light sources 205 is into the local area. Such projection of light from overlapping light sources 205 into the local area provides uniform illumination of a region in the local area to which the lens assembly 215 directs light, in contrast to configurations were the focus of the lens assembly 215 is the emission plane 210. Increasing a uniformity with which a region of the local area is illuminated by the illuminator 200 increases an intensity with which the region of the local area is illuminated, improving depth sensing by a depth camera assembly without increasing power consumption by the array of light sources 205.

In some embodiments, the lens assembly 215 is configured to introduce aberrations into light received from the overlap plane 225, with the lens assembly 215 projecting the light with the introduced aberrations into the local area, as further described below in conjunction with FIG. 5. For example, the lens assembly 215 introduces spherical aberration into light received from the overlap plane 225, with the aberrations further diverging or spreading light from a light source 205 when the light is projected from an exit pupil of the lens assembly 215. For example, the lens assembly 215 includes a lens that has one or more deformities that introduce spherical aberration into light from the overlap plane 225 before the light exists an exit pupil of the lens assembly 215, increasing an amount of overlap between light from adjacent light sources 205 when the light illuminates a region within the local area. This allows the lens assembly 215 to further increase an amount of overlap between light from adjacent light sources 205 in the overlap plane 225 through the one or more aberrations introduced by the lens assembly 215 when light is directed through the lens assembly 215, providing increased uniformity with which the illuminator 200 illuminates a region within the local area with light from the array of light sources 205.

Figure 3:
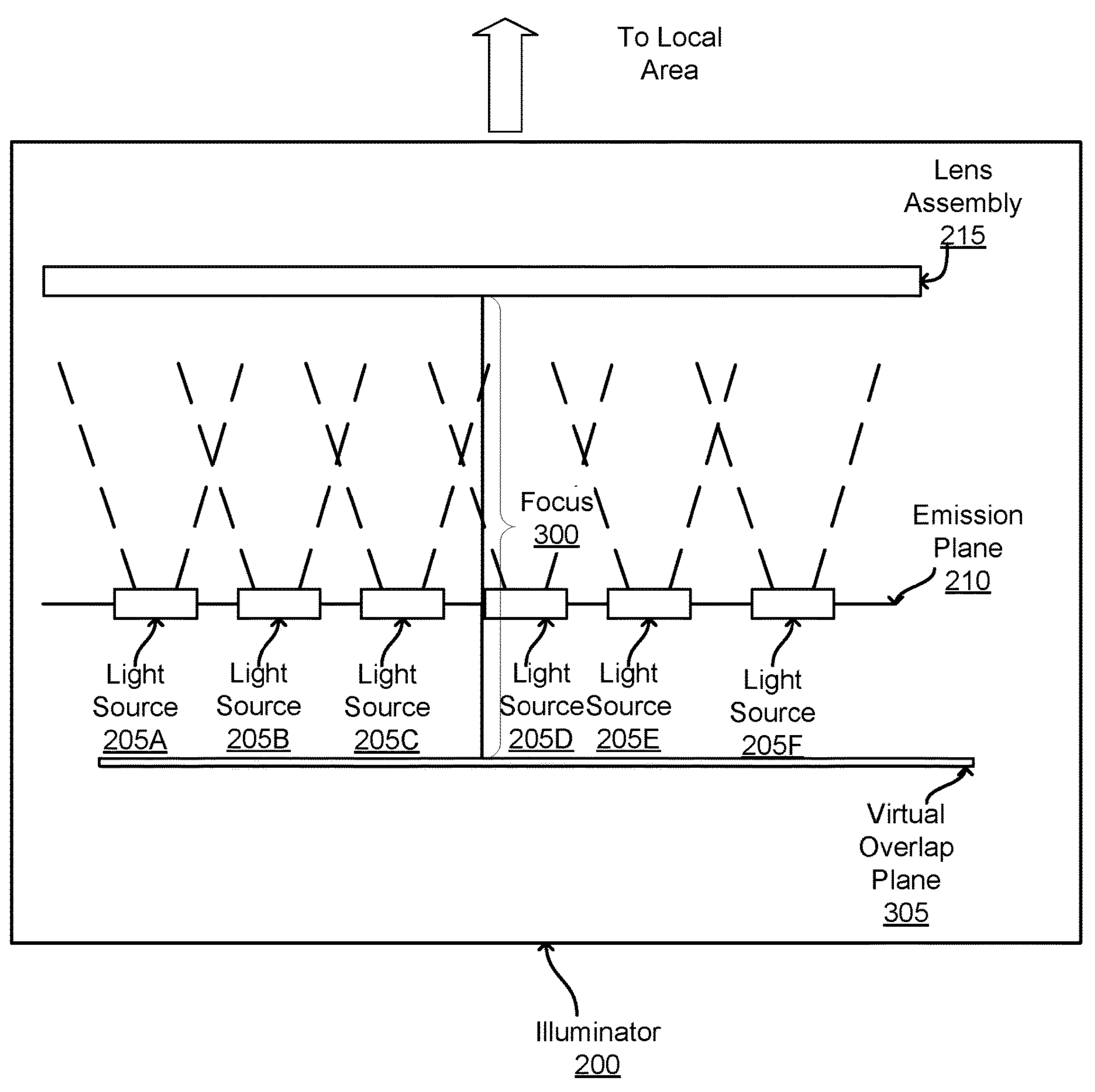
FIG. 3 is a block diagram of an alternative illuminator with a different position of the focus of the lens assembly, in accordance with one or more embodiments.

While FIG. 2 shows an embodiment where the overlap plane 225 is positioned nearer to the local area than the emission plane 210 along an axis perpendicular to the emission plane 210, FIG. 3 shows an alternative embodiment of an illuminator 200 where the lens assembly 215 has a different focus. Similar to FIG. 2, the illuminator 200 in FIG. 3 includes an array of light sources 205A-F and a lens assembly 215. In the example shown by FIG. 3, the lens assembly 215 is positioned such that a focus 300 of the lens assembly 215 coincides with a virtual overlap plane 305 of the array of light sources 205 positioned farther from the local area than the emission plane 210 along the axis perpendicular to the emission plane 210. In FIG. 3, the focus 300 of the lens assembly 215 is a location in the virtual overlap plane 305. In various embodiments, a distance between the emission plane 210 and the overlap plane 225 in FIG. 2 equals a distance between the emission plane 210 and the virtual overlap plane 305 in FIG. 3. However, the virtual overlap plane 305 is farther away from the local area along the axis perpendicular to the emission plane 210, while the overlap plane 225 is nearer to the local area along the axis perpendicular to the emission plane 210.

An illumination pattern within the virtual overlap plane 305 is symmetrical to an illumination pattern within the overlap plane 225. So, an illumination pattern emitted into the local area by the lens assembly 215 having the focus 300 within the virtual overlap plane 305 matches an illumination pattern emitted by the local area when the focus 220 of the lens assembly 215 is within the overlap plane 225. Hence, positioning the focus 300 of the lens assembly 215 within the virtual overlap plane 305 emits an illumination pattern into the local area where light emitted by adjacent light sources 205 in the array at least partially overlaps, as further described above in conjunction with FIG. 2.

Figure 4:
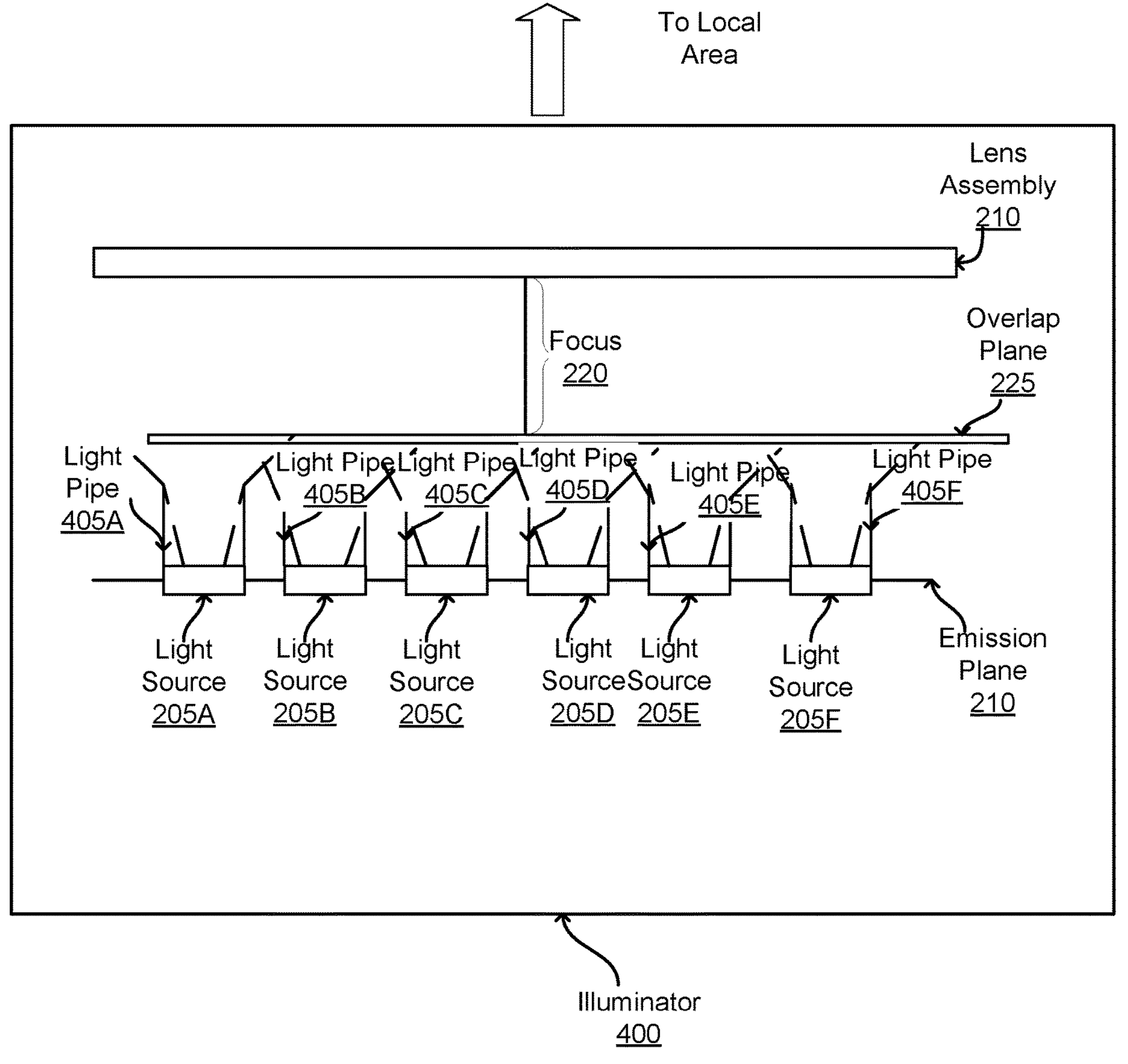
FIG. 4 is a block diagram of an illuminator including an array of light pipes, in accordance with one or more embodiments.

In various embodiments, additional optical components may be included in an illuminator to further modify an illumination pattern of light emitted into the local area from a lens assembly of the illuminator. FIG. 4 shows an example of an illuminator 400 including an array of light pipes 405A-F. The illuminator 400 shown in FIG. 4 includes an array of light sources 205A-F and a lens assembly 215, as further described above in conjunction with FIG. 2. Additionally, the illuminator 400 includes an array of light pipes 405A-F (also referred to individually and collectively using reference number 405).

In the illuminator 400, a light pipe 405 is coupled to each light source 205. A light pipe 405 is a waveguide having a first opening coupled to an emission surface of a light source and a second opening that is at an opposite end of the light pipe 405 than the first opening. The light pipe 405 directs light received via the first opening to the second opening, where the light exits the light pipe 405. Between the first opening and the second opening, light is contained within the light pipe 405. For example, for a hollow light pipe, reflection of light emitted by a light source 205 keeps the light within an interior of the light pipe 405 coupled to the light source 205 from the first opening to the second opening. Note in some embodiments, the light pipes may be solid. Solid light pipes may also be used to direct via, e.g., total internal reflection, light from a light source to the overlap plane 225. In various embodiments, a light pipe 405 is rigid, while in other embodiments the light pipe 405 is flexible. Coupling a light pipe 405 to each light source 205 limits divergence of light emitted by a light source 205 to a diameter of the light pipe 405 for the length of the light pipe 405.

After exiting the second opening of a light pipe 405, light diverges. In the example of FIG. 4, the lens assembly 215 is positioned relative to an emission plane 210 including emission surfaces of each light source 205 so a focus 220 of the lens assembly is in an overlap plane 225. As further described above in conjunction with FIG. 2, the emission plane 210 is a location from the emission plane 210 along an axis perpendicular to the emission plane 210 so light emitted by adjacent light sources 205 at least partially overlaps (or overlaps by at least a threshold amount) when the light exits light pipes 405 coupled to the respective light sources 205. In various embodiments a length of each light pipe 405 is less than a distance between the emission plane 210 and the overlap plane 225, so the overlap plane 225 corresponds to a location where light exiting second openings of adjacent light pipes 405 overlaps by at least a threshold amount, or at least partially overlaps.

While FIGS. 2-4 describe illuminators that position a focus of a lens assembly 215 relative to an emission plane 210 of light sources 205 to project more uniform light from the light sources 205 into a local area, in some embodiments, the focus of a lens assembly is within the emission plane of the light sources and a lens assembly of an illuminator is configured to introduce overlap between light emitted by adjacent light sources when projecting light into the local area. FIG. 5 is an example of an illuminator where one or more characteristics of a lens assembly cause overlap between light emitted by adjacent light sources prior to projection of the emitted light into a local area. In the example of FIG. 5, the illuminator 500 includes an array of light sources 205A-F (also referred to individually and collectively using reference number 205) and a lens assembly 505. In other embodiments, the illuminator 500 includes different or additional components than those described in conjunction with FIG. 5.

As further described above in conjunction with FIG. 2, light sources 205 of the array of light sources 205 each emit light towards a local area in response to receiving a control signal. The light sources 205 may be organized into multiple groups, with each group including one or more light sources 205. Different groups may receive different control signals in various embodiments, allowing selected groups of light sources 205 to emit light, while other groups of unselected light sources 205 do not emit light. The light sources 205 are positioned so an optical aperture of each light source 205 through which light is emitted is in a common plane, the emission plane 210. For example, each light source 205 is a vertical surface emitting cavity laser (VSCEL), with the VSCELs positioned relative to each other so an optical aperture of each VSCEL is positioned in the emission plane 210. Adjacent light sources 205 in the array are separated by a distance. A common distance is between each pair of adjacent light sources 205 in some embodiments.

The lens assembly 505 is positioned a distance from the emission plane 210 along an axis perpendicular to the emission plane 210 so a focus 510 of the lens assembly 505 is within the emission plane 210. However, light emitted by different light sources 205 has minimal divergence in the emission plane 210, so an illumination pattern at the emission plane 210 comprises discrete beams of light where light from a light source 205 does not overlap with light from an adjacent light source 205. As the lens assembly 505 projects the illumination pattern at the focus 510 of the lens assembly 505 into the local area, having the focus 510 of the lens assembly 505 within the emission plane 210 causes projection of discrete beams of light from the emission plane 210 into the local area.

To provide more uniform illumination for a region of the local area, the lens assembly 505 introduces one or more aberrations to light from the emission plane 210 that expands or spreads light from the emission plane 210 before being projected into a region of a local area. In various embodiments, a lens of the lens assembly 505 is deformed to introduce aberration into light emitted by the lens assembly 505. For example, a lens nearest an exit pupil of the lens assembly 505 is deformed to introduce aberration, such as spherical aberration, into light exiting the exit pupil of the lens assembly 505 into the local area. In some embodiments, the lens assembly 505 is a collimating lens that spreads, or expands, light received from the emission plane 210, with a portion of the collimating lens nearest an exit pupil of the collimating lens deformed to introduce one or more aberrations, such as a spherical aberration, into light that the lens assembly 505 projects into the local area. Configuring the lens assembly 505 to introduce one or more aberrations into light received from the emission plane 210 causes the lens assembly 505 to introduce overlap between light emitted by adjacent light sources 205 when the light is projected into the local area from the lens assembly 505, increasing a uniformity with which a region within the local area is illuminated by light emitted by the array of light sources 205 without repositioning the focus 510 of the lens assembly 505 from the emission plane 210.

Figure 5:
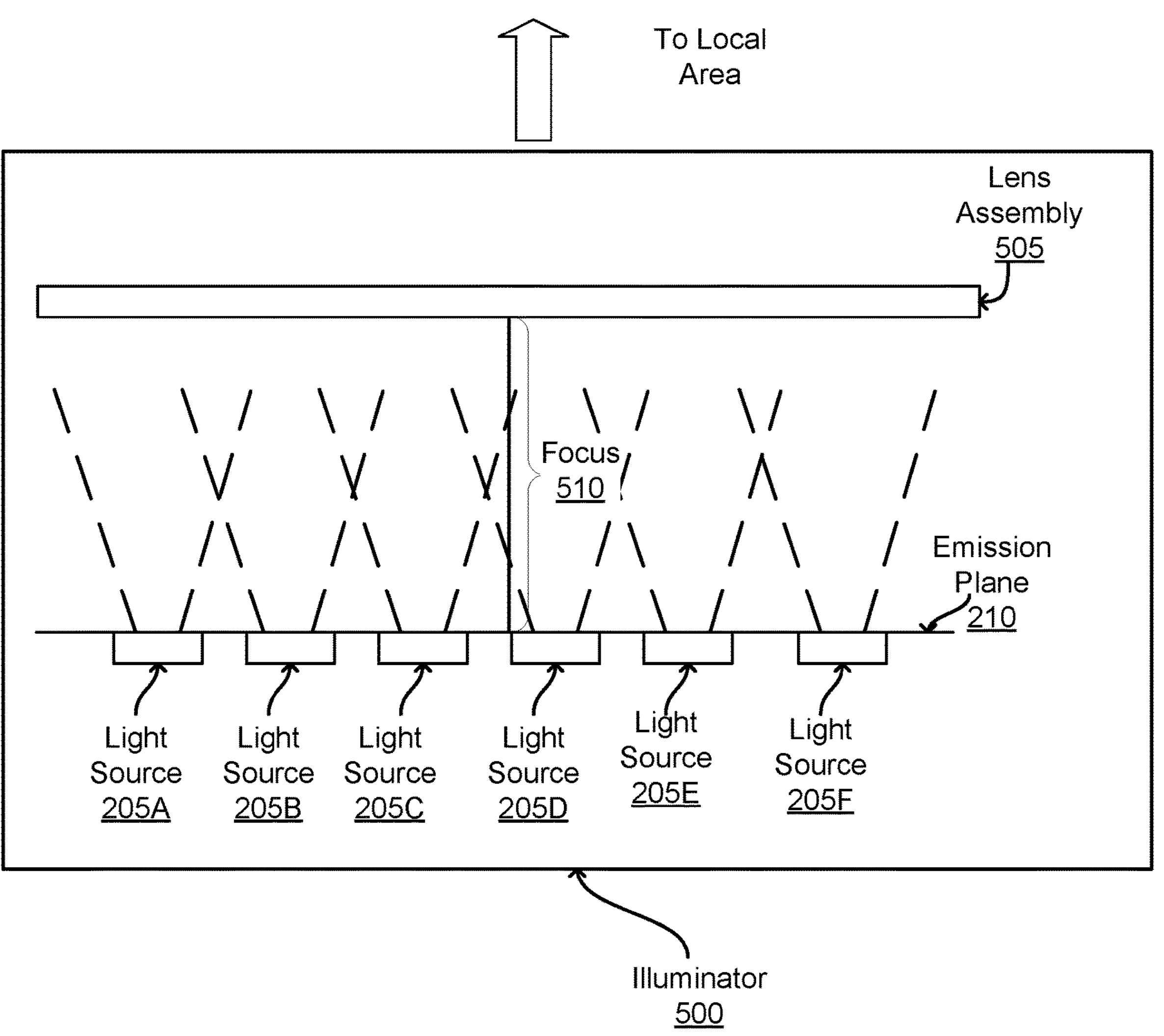
FIG. 5 is an illuminator where one or more characteristics of a lens assembly cause overlap between light emitted by adjacent light sources prior to transmission of the emitted light into a local area, in accordance with one or more embodiments.
Figure 6:
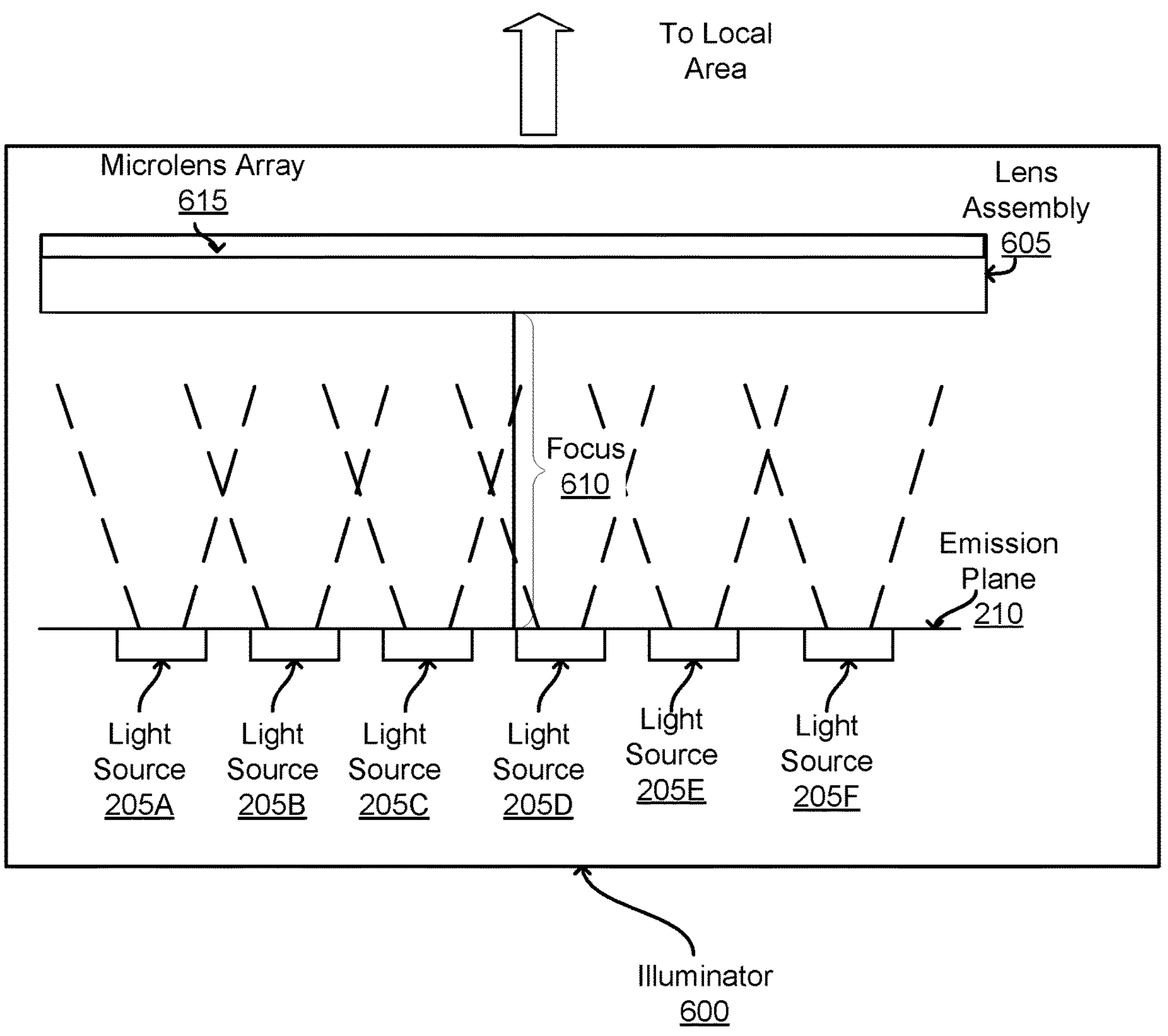
FIG. 6 is an illuminator having a lens assembly including a microlens array, in accordance with one or more embodiments.

While FIG. 5 shows an embodiment where properties of the lens assembly 505 introduce overlap between light emitted by adjacent light sources 205 of an array, in various embodiments, additional optical components are included in the lens assembly to introduce aberrations causing overlap between light emitted by adjacent light sources 205. FIG. 6 shows an embodiment of an illuminator 600 having a lens assembly 605 including a microlens array 615. In the embodiment shown by FIG. 6, the illuminator 600 includes an array of light sources 205A-F and the lens assembly 605, while different or additional components may be included in other embodiments.

As further described above in conjunction with FIG. 2, light sources 205 of the array of light sources 205 each emit light towards a local area in response to receiving a control signal. The light sources 205 may be organized into multiple groups, with each group including one or more light sources 205. For example, each light source 205 is a vertical surface emitting cavity laser (VSCEL), while in other embodiments a light source may be another device configured to emit light.

The lens assembly 605 is positioned a distance from the emission plane 210 so a focus 610 of the lens assembly 605 is within the emission plane 210. However, an illumination pattern from the light sources 205 within the emission plane 210 comprises discrete beams of light where light from a light source 205 does not overlap with light from an adjacent light source 205, as light emitted by light sources 205 has minimal divergence in the emission plane 210. As the lens assembly 605 projects the illumination pattern at the focus 610 of the lens assembly 605 into the local area, having the focus 610 of the lens assembly 605 within the emission plane 210 causes projection of discrete beams of light from the emission plane 210 into the local area.

To increase uniformity with which a region in the local area is illuminated, the lens assembly 605 includes a microlens array 615. The microlens array 615 comprises a plurality of microlenses arranged in a one-dimensional or a two-dimensional array. In various embodiments, each microlens of the microlens array 615 has a dimeter less than 1 millimeter. The microlens array 615 is positioned at an exit pupil of the lens assembly 605 where light exits the lens assembly 605 into the local area surrounding the illuminator 600. The microlens array 615 divides the exit pupil of the lens assembly 605 into a number of sub-exit pupils each having a smaller diameter than the exit pupil. In various embodiments, the number of sub-exit pupils created by the microlens array 615 equals a number of microlenses in the microlens array 615, with the positions of sub-exit pupils relative to each other based on positions of microlenses relative to each other.

In various embodiments, the microlenses comprising the microlens array 615 are each prisms, with each prism deviating an angle of light exiting a sub-exit pupil corresponding to a prism. The deviation in light caused by microlenses (e.g., prisms) results in light exiting the lens assembly 605 to have an illumination pattern corresponding to a pattern of the microlenses in the microlens array 615. For example, the microlens array 615 is a 2 by 2 array of prisms, so an illumination pattern from a light source 205 emitted into the local area by the lens assembly 605 is a 2 by 2 array of beams of light. As another example, the microlens array 615 includes multiple wedge lenses, with a wedge lens functioning as a combination of a prism and an aberration generator. A wedge lens has less than a threshold angle between its input surface and its output surface.

Figure 7:
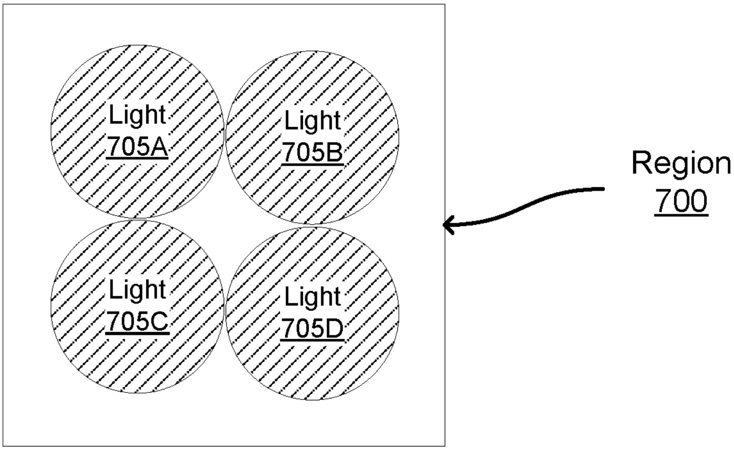
FIG. 7 an example of an illumination pattern output by an illuminator with a lens assembly including a microlens array, in accordance with one or more embodiments.
Figure 7:
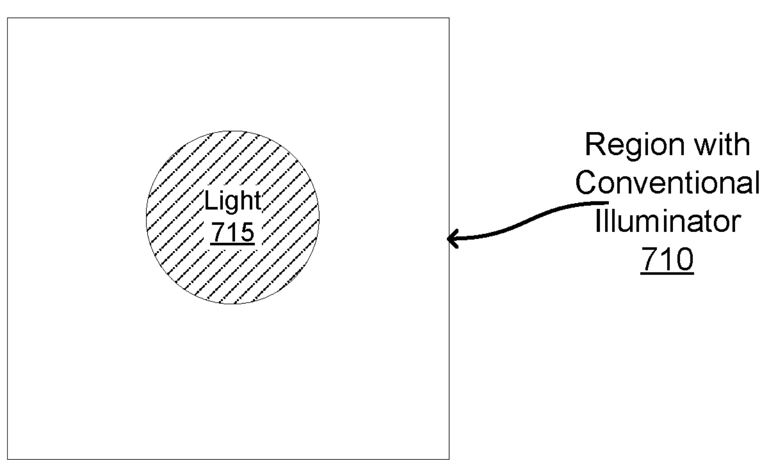

FIG. 7 shows an example of an illumination pattern output by the lens assembly 605 of FIG. 6. In the example of FIG. 7, the microlens array 615 of the lens assembly 605 comprises a 2 by 2 array of prisms. For purposes of illustration, FIG. 7 shows illumination of a region 700 in the local area onto which light from the illuminator 600 is projected. FIG. 7 shows an illumination pattern output by the lens assembly 605 including a microlens array 615 and having a focus in the emission plane 210 of a light source 205. In the example of FIG. 7, light emitted by the single light source 205 is received by the lens assembly 605, which directs the light through the microlens array 615 and into the local area. The output of the microlens array 615 exits the lens assembly 605 and results in projection of light beam 705A, light beam 705B, light beam 705C, and light beam 705D from the lens assembly 605 into the region 700. The locations of light beams 705A-D relative to each other are determined by positions of microlenses relative to each other in the microlens array 615. In the example of FIG. 7, the microlens array 615 includes a 2 by 2 array of microlenses, resulting in the 2 by 2 pattern of light beams 705A-D emitted into the local area by the lens assembly 605.

For comparison, FIG. 7 shows an alternative where a region 710 is illuminated by a conventional illuminator having a conventional lens assembly with a focus in the emission plane 210 of the light source 205. In such a conventional configuration, a single beam of light 715 is projected from a single light source 205 into the region 710. Projecting the single beam of light 715 from the single light source 205 illuminates a smaller area of the region 710 than the area of the region 705 illuminated by the multiple beams of light 705A-D that the microlens array 615 projects from the single light source 205. Hence, the microlens array 615 allows more uniform illumination of the region 705 compared to illumination provided by a conventional illuminator.

Referring back to FIG. 6, in some embodiments, the lens assembly 605 includes the microlens array 615 and is configured to introduce one or more aberrations into light exiting the lens assembly 605, as further described above in conjunction with FIG. 5. Such a combination of the microlens array 615 and configuration of the lens assembly 605 to introduce one or more aberrations allows the lens assembly 605 to broaden or to spread light emitted by a light source 205 while dividing the broadened light into a pattern corresponding to the pattern of microlenses of the microlens array 615, increasing a uniformity with which the illuminator 600 illuminates a region of the local area. Further, in some embodiments, the focus 610 of the lens assembly 605 is an overlap plane 225, as further described above in conjunction with FIGS. 2-4, rather than the emission plane 210. Having the focus 610 of the lens assembly 605 in the overlap plane 225, where there is at least partial overlap between light emitted by adjacent light sources 205, allows the illuminator 600 to further increase uniformity of illumination a region within the local area.

Figure 8:
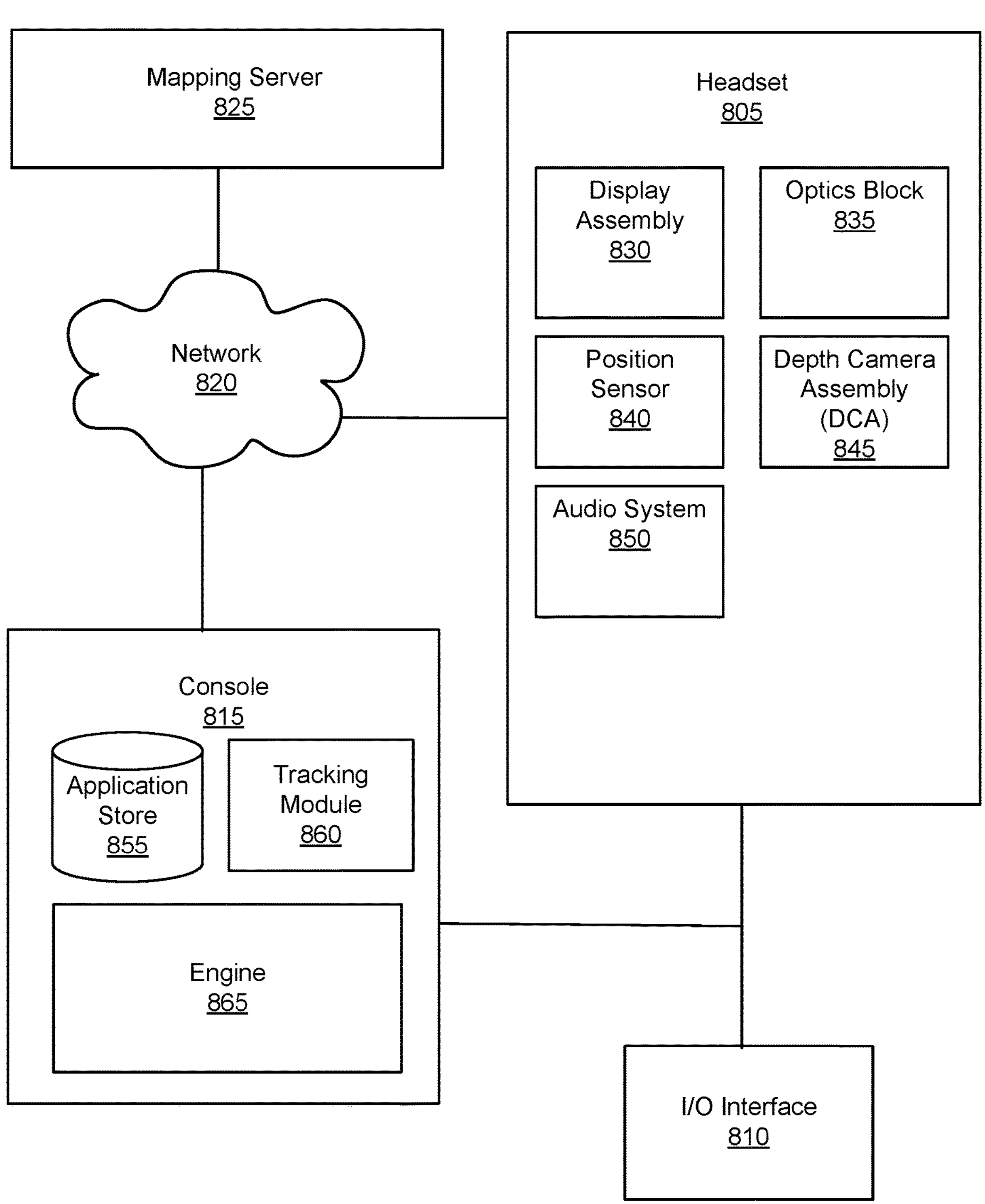
FIG. 8 is a system that includes a headset, in accordance with one or more embodiments.

FIG. 8 is a system 800 that includes a headset 805, in accordance with one or more embodiments. In some embodiments, the headset 805 may be the headset 100 of FIG. 1A or the headset 105 of FIG. 1B. The system 800 may operate in an artificial reality environment (e.g., a virtual reality environment, an augmented reality environment, a mixed reality environment, or some combination thereof). The system 800 shown by FIG. 8 includes the headset 805, an input/output (I/O) interface 810 that is coupled to a console 815, the network 820, and the mapping server 825. While FIG. 8 shows an example system 800 including one headset 805 and one I/O interface 810, in other embodiments any number of these components may be included in the system 800. For example, there may be multiple headsets each having an associated I/O interface 810, with each headset and I/O interface 810 communicating with the console 815. In alternative configurations, different and/or additional components may be included in the system 800. Additionally, functionality described in conjunction with one or more of the components shown in FIG. 8 may be distributed among the components in a different manner than described in conjunction with FIG. 8 in some embodiments. For example, some or all of the functionality of the console 815 may be provided by the headset 805.

The headset 805 includes the display assembly 830, an optics block 835, one or more position sensors 840, and the DCA 845. Some embodiments of headset 805 have different components than those described in conjunction with FIG. 8. Additionally, the functionality provided by various components described in conjunction with FIG. 8 may be differently distributed among the components of the headset 805 in other embodiments, or be captured in separate assemblies remote from the headset 805.

The display assembly 830 displays content to the user in accordance with data received from the console 815. The display assembly 830 displays the content using one or more display elements (e.g., the display elements 120). A display element may be, e.g., an electronic display. In various embodiments, the display assembly 830 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 835.

The optics block 835 may magnify image light received from the electronic display, correct optical errors associated with the image light, and present the corrected image light to one or both eyeboxes of the headset 805. In various embodiments, the optics block 835 includes one or more optical elements. Example optical elements included in the optics block 835 include: an aperture, a Fresnel lens, a convex lens, a concave lens, a filter, a reflecting surface, or any other suitable optical element that affects image light. Moreover, the optics block 835 may include combinations of different optical elements. In some embodiments, one or more of the optical elements in the optics block 835 may have one or more coatings, such as partially reflective or anti-reflective coatings.

Magnification and focusing of the image light by the optics block 835 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 835 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 835 corrects the distortion when it receives image light from the electronic display generated based on the content.

The position sensor 840 is an electronic device that generates data indicating a position of the headset 805. The position sensor 840 generates one or more measurement signals in response to motion of the headset 805. The position sensor 190 is an embodiment of the position sensor 840. Examples of a position sensor 840 include: one or more IMUs, one or more accelerometers, one or more gyroscopes, one or more magnetometers, another suitable type of sensor that detects motion, or some combination thereof. The position sensor 840 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 805 from the sampled data. For example, the IMU integrates the measurement signals received from the accelerometers over time to estimate a velocity vector and integrates the velocity vector over time to determine an estimated position of a reference point on the headset 805. The reference point is a point that may be used to describe the position of the headset 805. While the reference point may generally be defined as a point in space, however, in practice the reference point is defined as a point within the headset 805.

The DCA 845 generates depth information for a portion of the local area. The DCA includes one or more imaging devices and a DCA controller. The DCA 845 may also include an illuminator. Operation and structure of the DCA 845 is described above with regard to FIG. 1A. In various embodiments, the illuminator of the DCA 845 is configured to uniformly illuminate a region within a local area surrounding the headset 805 using an array of light sources. As further described above in conjunction with FIGS. 2-7, in various embodiments, the illuminator includes a lens assembly configured to project light from different light sources so light from adjacent light sources at least partially overlaps, or overlaps at least a threshold amount, into the region of the local area. The overlap between light from adjacent light sources increases uniformity of illumination of the region by the illuminator of the DCA 845, improving accuracy of depth information determined by the DCA 845.

The audio system 850 provides audio content to a user of the headset 805. The audio system 850 may comprise one or acoustic sensors, one or more transducers, and an audio controller. The audio system 850 may provide spatialized audio content to the user. In some embodiments, the audio system 850 may request acoustic parameters from the mapping server 825 over the network 820. The acoustic parameters describe one or more acoustic properties (e.g., room impulse response, a reverberation time, a reverberation level, etc.) of the local area. The audio system 850 may provide information describing at least a portion of the local area from e.g., the DCA 845 and/or location information for the headset 805 from the position sensor 840. The audio system 850 may generate one or more sound filters using one or more of the acoustic parameters received from the mapping server 825, and use the sound filters to provide audio content to the user.

The I/O interface 810 is a device that allows a user to send action requests and receive responses from the console 815. An action request is a request to perform a particular action. For example, an action request may be an instruction to start or end capture of image or video data, or an instruction to perform a particular action within an application. The I/O interface 810 may include one or more input devices. Example input devices include: a keyboard, a mouse, a game controller, or any other suitable device for receiving action requests and communicating the action requests to the console 815. An action request received by the I/O interface 810 is communicated to the console 815, which performs an action corresponding to the action request. In some embodiments, the I/O interface 810 includes an IMU that captures calibration data indicating an estimated position of the I/O interface 810 relative to an initial position of the I/O interface 810. In some embodiments, the I/O interface 810 may provide haptic feedback to the user in accordance with instructions received from the console 815. For example, haptic feedback is provided when an action request is received, or the console 815 communicates instructions to the I/O interface 810 causing the I/O interface 810 to generate haptic feedback when the console 815 performs an action.

The console 815 provides content to the headset 805 for processing in accordance with information received from one or more of: the DCA 845, the headset 805, and the I/O interface 810. In the example shown in FIG. 8, the console 815 includes an application store 855, a tracking module 860, and an engine 865. Some embodiments of the console 815 have different modules or components than those described in conjunction with FIG. 8. Similarly, the functions further described below may be distributed among components of the console 815 in a different manner than described in conjunction with FIG. 8. In some embodiments, the functionality discussed herein with respect to the console 815 may be implemented in the headset 805, or a remote system.

The application store 855 stores one or more applications for execution by the console 815. An application is a group of instructions, that when executed by a processor, generates content for presentation to the user. Content generated by an application may be in response to inputs received from the user via movement of the headset 805 or the I/O interface 810. Examples of applications include: gaming applications, conferencing applications, video playback applications, or other suitable applications.

The tracking module 860 tracks movements of the headset 805 or of the I/O interface 810 using information from the DCA 845, the one or more position sensors 840, or some combination thereof. For example, the tracking module 860 determines a position of a reference point of the headset 805 in a mapping of a local area based on information from the headset 805. The tracking module 860 may also determine positions of an object or virtual object. Additionally, in some embodiments, the tracking module 860 may use portions of data indicating a position of the headset 805 from the position sensor 840 as well as representations of the local area from the DCA 845 to predict a future location of the headset 805. The tracking module 860 provides the estimated or predicted future position of the headset 805 or the I/O interface 810 to the engine 865.

The engine 865 executes applications and receives position information, acceleration information, velocity information, predicted future positions, or some combination thereof, of the headset 805 from the tracking module 860. Based on the received information, the engine 865 determines content to provide to the headset 805 for presentation to the user. For example, if the received information indicates that the user has looked to the left, the engine 865 generates content for the headset 805 that mirrors the user's movement in a virtual local area or in a local area augmenting the local area with additional content. Additionally, the engine 865 performs an action within an application executing on the console 815 in response to an action request received from the I/O interface 810 and provides feedback to the user that the action was performed. The provided feedback may be visual or audible feedback via the headset 805 or haptic feedback via the I/O interface 810.

The network 820 couples the headset 805 and/or the console 815 to the mapping server 825. The network 820 may include any combination of local area and/or wide area networks using both wireless and/or wired communication systems. For example, the network 820 may include the Internet, as well as mobile telephone networks. In one embodiment, the network 820 uses standard communications technologies and/or protocols. Hence, the network 820 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 820 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 820 can be represented using technologies and/or formats including image data in binary form (e.g., Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 825 may include a database that stores a virtual model describing a plurality of spaces, wherein one location in the virtual model corresponds to a current configuration of a local area of the headset 805. The mapping server 825 receives, from the headset 805 via the network 820, information describing at least a portion of the local area and/or location information for the local area. The user may adjust privacy settings to allow or prevent the headset 805 from transmitting information to the mapping server 825. The mapping server 825 determines, based on the received information and/or location information, a location in the virtual model that is associated with the local area of the headset 805. The mapping server 825 determines (e.g., retrieves) one or more acoustic parameters associated with the local area, based in part on the determined location in the virtual model and any acoustic parameters associated with the determined location. The mapping server 825 may transmit the location of the local area and any values of acoustic parameters associated with the local area to the headset 805.

One or more components of system 800 may contain a privacy module that stores one or more privacy settings for user data elements. The user data elements describe the user or the headset 805. For example, the user data elements may describe a physical characteristic of the user, an action performed by the user, a location of the user of the headset 805, a location of the headset 805, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 800 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An illuminator comprising:

an array of light sources, each light source configured to emit light; and a lens assembly configured to receive light emitted by one or more of the light sources and to direct the light into a local area, the lens assembly positioned relative to the array of light sources so a focus of the lens assembly is within an overlap plane where light from adjacent light sources of the array at least partially overlap, the overlap plane separated from an emission plane including a surface of the light sources from which light is emitted.

2. The illuminator of claim 1, wherein the array of light sources comprises a plurality of groups of light sources, where each group of light sources is individually addressable.

3. The illuminator of claim 1, wherein the lens assembly comprises a projection lens.

4. The illuminator of claim 1, wherein the overlap plane is nearer to the local area than the emission plane along an axis perpendicular to the emission plane.

5. The illuminator of claim 1, wherein the overlap plane is farther from the local area than the emission plane along an axis perpendicular to the emission plane.

6. The illuminator of claim 1, wherein the lens assembly is configured to introduce one or more aberrations into light received by the one or more light sources prior to direction into the local area.

7. The illuminator of claim 1, wherein the lens assembly includes a microlens array comprising a plurality of microlenses at an exit pupil of the lens assembly forming a plurality of sub-exit pupils each corresponding to a microlens, the lens assembly directing light to the local area through the exit pupil, and each microlens configured to deviate an angle of light exiting a sub-exit pupil corresponding to the microlens.

8. The illuminator of claim 7, wherein each microlens comprises a prism.

9. The illuminator of claim 7, wherein each microlens comprises a wedge lens.

10. The illuminator of claim 1, further comprising a plurality of light pipes, each light pipe coupled to a light source of the array at a first opening and configured to direct light from the first opening to a second opening, and each light pipe between the emission plane and the overlap plane.

11. The illuminator of claim 1, wherein the lens assembly is a collimating lens.

12. An illuminator comprising:

an array of light sources, each light source configured to emit light; and a lens assembly configured to receive light emitted by one or more of the light sources and to direct the light into a local area, the lens assembly having a focus within an emission plane including surfaces of the light sources from which light is emitted and configured to introduce one or more aberrations into light from a light source that disperses light from the light source prior to direction into the local area.

13. The illuminator of claim 12, wherein an aberration comprises a spherical aberration.

14. The illuminator of claim 12, wherein the lens assembly includes a microlens array comprising a plurality of microlenses at an exit pupil of the lens assembly forming a plurality of sub-exit pupils each corresponding to a microlens, the lens assembly directing light to the local area through the exit pupil, and each microlens configured to deviate an angle of light exiting a sub-exit pupil corresponding to the microlens.

15. The illuminator of claim 14, wherein each microlens comprises a prism.

16. The illuminator of claim 14, wherein each microlens comprises a wedge lens.

17. A depth camera assembly comprising:

an illuminator including:

an array of light sources, each light source configured to emit light; and a lens assembly configured to receive light emitted by one or more of the light sources and to direct the light into a local area, the lens assembly positioned relative to the array of light sources so a focus of the lens assembly is within an overlap plane where light from adjacent light sources of the array at least partially overlap, the overlap plane separated from an emission plane including a surface of the light sources from which light is emitted; and one or more imaging devices configured to capture images of a region of the local area into which light from the illuminator is directed.

18. The depth camera assembly of claim 17, wherein the overlap plane is nearer to the local area than the emission plane along an axis perpendicular to the emission plane.

19. The depth camera assembly of claim 17, wherein the overlap plane is farther from the local area than the emission plane along an axis perpendicular to the emission plane.

20. The depth camera assembly of claim 17, wherein the illuminator is a time-of-flight illuminator, and wherein the lens assembly is configured to provide flood illumination to the local area.

* * * * *